Sept. 22, 1936.   A. H. THOMAS   2,055,266
WEED EXTERMINATING TOOL
Filed May 14, 1935   2 Sheets-Sheet 1
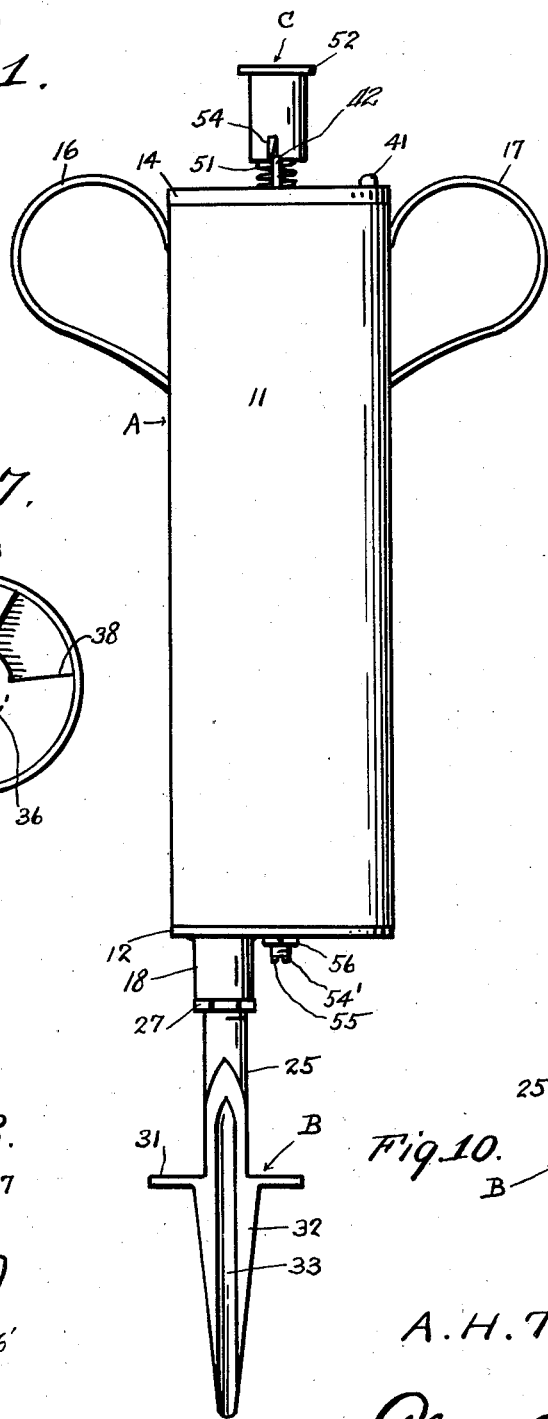
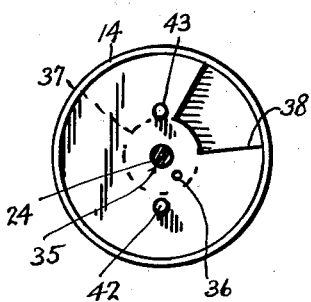
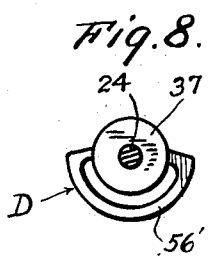
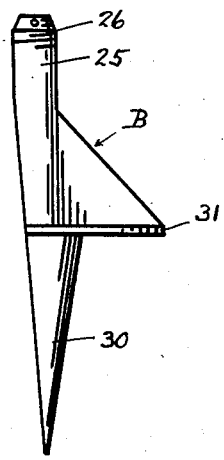
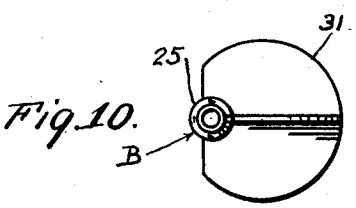
Inventor
A. H. Thomas
By Clarence A. O'Brien
Attorney Sept. 22, 1936.                A. H. THOMAS                  2,055,266
                           WEED EXTERMINATING TOOL
                             Filed May 14, 1935            2 Sheets-Sheet 2
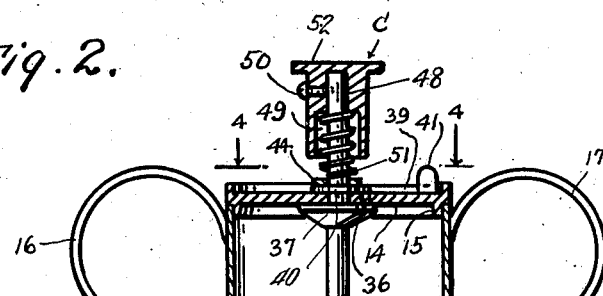
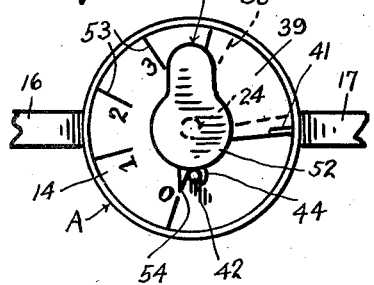
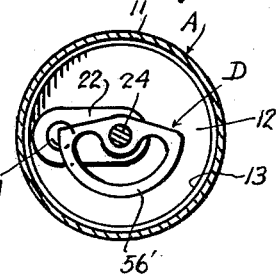
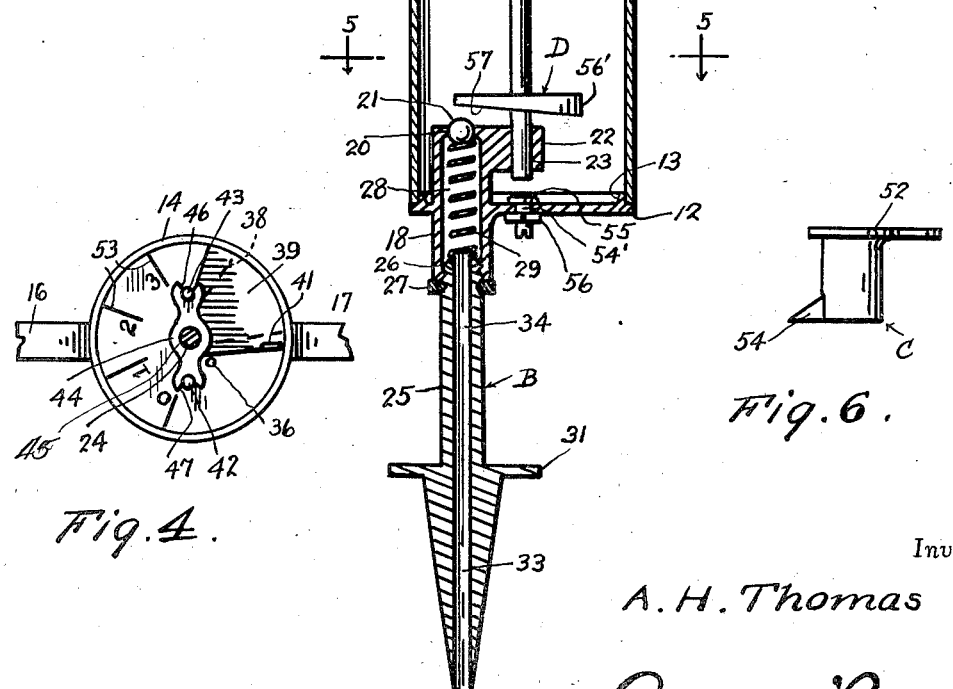
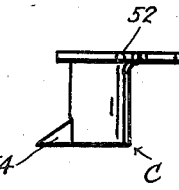
Inventor
A. H. Thomas
By Clarence A. O'Brien
                                        Attorney Patented Sept. 22, 1936

2,055,266

UNITED STATES PATENT OFFICE 2,055,266

WEED EXTERMINATING TOOL

Albert H. Thomas, Lakewood, Ohio, assignor of one-half to Natt Corbin, Lexington, Ky.

Application May 14, 1935, Serial No. 21,458

5 Claims. (Cl. 47—49)

This invention relates to a weed exterminating tool to be used in destroying obnoxious weeds, such as dandelions in the lawns by opening up the heart of the weed and injecting a liquid weed killer into the roots; in which there is intimate mixing of this liquid with the juices of the weed; or which will confine the flow of liquid to the exact area desired, and aportion the liquid in measured amounts for the different sizes of weeds as needed, thereby causing economy of the liquid and also eliminating the chances of killing the grass around small weeds by an over supply of destructive liquid weed killer.

Another object of the invention is the arrangement of the parts to prevent a vacuum in the container during the moment of liquid injection.

A further object of the invention is to construct a tool that can be handled and manipulated efficiently and with ease by either hand without stooping, and further, can be manufactured at low cost.

A still further important feature of the invention is a limit depth stop in combination with a tapered channel for the liquid outlet of the injector nozzle to prevent the liquid outlet from becoming clogged with earth when inserted into the weed and ground.

Another important feature of the invention is the combination of parts on the upper end of the tool to facilitate the filling of the reservoir and for regulating the amount of liquid needed and for opening of the injector nozzle valve.

With the foregoing and other objects of the invention in view it will be obvious that numerous changes and alterations might be made in the general form and arrangement of parts described without departing from the invention and hence I do not wish to limit myself to the details set forth but shall consider myself at liberty to make such changes and alterations as barely fall within the spirit and scope of the appended claims.

In the drawings wherein for the purpose of illustration is shown the preferred embodiment of the invention and where like reference characters indicate like parts throughout the several views:

Figure 1 is a side elevation of the weed exterminating tool in accordance with the present invention.

Figure 2 is a detailed vertical section through the tool.

Figure 3 is a top plan view of the tool having outer portions of the finger gripping handles broken away.

Figures 4 and 5 are horizontal sectional views taken respectively substantially on the planes of lines 4—4 and 5—5 of Figure 2 and looking in the direction of the arrows.

Figure 6 is an elevation of the thumb cap removed from the projecting end of the valve operating rod.

Figure 7 is a top plan view of the top of the container with the parts removed therefrom.

Figure 8 is a section through the valve operating rod showing the valve operating member in top plan view.

Figure 9 is a side elevation of the injecting nozzle removed from the container.

Figure 10 is a top plan view of Figure 9.

Referring to the drawings in detail, A indicates the container for the weedkilling liquid, the side walls 11 of which are tubular. The bottom of the container A is closed by the bottom wall 12 the periphery of which is anchored to the lower ends of tubular side walls 11 as at 13. The top of container A is closed by the top wall 14 the periphery of which is secured to the upper edge of the side walls as at 15. Adjacent the top of the container there are a pair of diametrically opposed finger gripping handles 16, 17 secured to the side walls 11.

Adjacent the center of bottom wall 12 there is mounted an upright sleeve 18. The upper portion of the sleeve extends into the liquid containing chamber 19. On the upper end of sleeve 18 is the valve seat 20 in which seats the ball valve 21. The upper end of sleeve 18 is formed with a lateral boss 22 which boss is disposed inside the chamber 19 and terminates above the bottom wall 12. In the boss 22 is a vertical bearing opening 23 which slidably and rotatably supports the inner end of the valve operating rod 24.

The injecting nozzle is indicated generally at B and this nozzle is formed with a round neck 25 which is threaded into the lower projecting end of sleeve 18 as at 26 and to lock the nozzle to the sleeve there is a nut 27 embracing the threaded upper end of the neck and bearing against the lower end of the sleeve. In the compartment 28 of the sleeve 18 is vertically arranged a coil spring 29 one end of which bears on the upper end of neck 25 while the other end bears on the ball valve 21 normally holding this valve in closed position. In closed position under the tension of spring 29 it will be seen that less than a hemisphere of the ball projects above the top of the sleeve for engagement with the valve operating member. The lower end of nozzle B is formed into a point 30 and where the point joins with the lower end of neck 25 there is a lateral flange 31 which limits the insertion of the injecting nozzle B into the weed and the earth. This flange 31 is approximately located in the center of the injecting nozzle B. A portion of the lower end of neck 25 and one side of the point 30 are formed with a continuous flat surface 32 which inclines outwardly and upwardly from the terminal of point 30. In this flat side 32 is a liquid conducting channel 33 which merges with a bore 34 in the upper portion of neck 25 above the lateral flange 31. The foregoing construction prevents earth from getting into the bore 34 because at the point where the channel merges with the lower end of the bore 34 it is never submerged in the earth on account of the flange 31 limiting the downward insertion of the point 30 into the earth.

The operating rod 24 extends through the top wall 14 and for slidably and rotatably supporting the upper portion of this valve operating rod 24 there is an opening 35 in the center of the top wall. Adjacent the bearing opening 35 is a small vent opening 36 which is controlled by a disk valve 37 rigidly secured to the rod 24 inside the chamber 19. When rod 24 moves inwardly to inject liquid disk 37 is moved free of the vent opening 36 whereby air is admitted to the liquid chamber 19.

In the margin of the top wall 14 is a fan-shaped filling opening 38 which opening is controlled by a sector-shaped flat cover plate 39 formed at the apex with an ear having an opening 40 which embraces a portion of the projecting end of the operating rod 24. Cover plate 39 slides on the upper face of upper wall 14 and for moving this cover plate there is an upstanding ear 41 on one of the radial edges. Secured to the outer face of upper wall 14 are a pair of upstanding pins 42, 43 on the diametric opposite sides of the opening 35. These pins are located between the center of top wall 14 and the periphery thereof. One radial edge of cover 39 bears against pin 43 in the closed position, while the other radial edge bears against the pin 42 in the open position. These pins limit the movement of the cover.

On top of the inner portion of cover 39 is an elongated washer plate 44 having an opening 45 in the center embracing the projecting portion of rod 24. On the opposite ends of washer plate 44 are slots 46, 47 which embrace the respective pins 43, 42. The washer plate 44 bearing on the inner portion of cover 39 prevents the cover from moving when the rod 24 is turned.

Mounted on the free projecting end of rod 24 is a cap C which is formed with an inner socket 48 merging with a counter socket 49 in the lower end. The end of operating rod 24 seats in socket 48 and is rigidly secured to the cap by the set screw 50. The upper end of a coil spring 51 seats in the counter socket 49 and bears against the cap while the lower end of spring 51 bears on the washer plate 44. The coil spring 51 embraces a portion of the projecting end of the rod 24, and this spring keeps the rod 24 in projected relation, the rod being limited in its outward movement by the face of disk valve 37 bearing against the inner face of top wall 14. The top face 52 of the cap C is flat and formed to accommodate the thumb for operating the rod 24.

The upper face of wall 14 is radially divided by lines or scorings 53 which cooperate with a pointer 54 formed laterally on the neck of the cap C so as to indicate the extent to which the valve 21 is opened. The operating rod 24 may only be turned within the limits between the pins 42, 43 because the pointer 54 swings in the path of these pins. It will thus be seen that when the pointer 54 is on the zero position pressing rod 24 inwardly will not open the valve and in this position the indicator is in abutment with pin 42, while in the fully opened position, the indicator will have been turned until it bears against the other pin 43.

For adjusting the axial movement of operating rod 24 there is a screw having a threaded portion 54' engaged with a threaded opening in lower wall 12. The inner end of the screw is formed with a head 55 which lies in the path of rod 24. The outer projecting end of the screw has a nut 56 mounted on the threaded portion 54 which nut bears against the lower face of lower wall 12 whereby the screw may be adjusted.

The valve operating member is indicated generally at D and is substantially segmental in shape. In the center the valve operating member D embraces the lower portion of the operating rod 24 and is rigidly secured thereto. Valve operating member D has an arcuate rim 56' and this rim is slightly less in extent than a semicircle. From one end to the other, the lower face of the rim is formed with an inclined cam 57. The rim 56' has a sweep in alignment with the ball valve 21. It will thus be seen that when operating shaft 24 has the indicator 54 in the zero position the pressing inwardly of rod 24 will not make the cam 57 bear on the ball. When rod 24 is turned clockwise until indicator 54 registers with the first marking 53, cam face will bear upon the valve 21 when the rod 24 is pressed inwardly. At the number 2 position, cam 57 will have been moved to a point where the ball valve 21 is pressed further inwardly by the difference in incline on the cam and as the cam 57 is moved further the valve will be opened wider until the maximum opening is reached at the greatest incline of the cam 57.

Having thus described the invention, what is claimed as new is:

1. A weed exterminating tool comprising a container, an injecting nozzle carried by the container equipped with a variable capacity valve, and a valve operating rod supported by the container provided with means for varying the capacity of the valve in response to the movement of the rod.

2. A weed exterminating tool comprising a container, including upper and lower end walls, an injecting nozzle carried by the lower end wall of the container and equipped with a normally closed yielding valve, a projectile operating rod rotatably supported by the container and having a portion thereof extending above the upper end wall of the container, a valve operating member carried by said rod, and said member formed with means to vary the opening of the valve which means is regulated by the rotary movement of the rod.

3. A weed exterminating tool comprising a container including upper and lower end walls, a bored pointed injecting nozzle carried by the lower end wall and equipped with a normally yielding valve, a spring pressed axially movable operating rod rotatably supported by the upper wall and having a portion thereof projecting above the container, a valve operating member provided with a cam face aligned with and normally spaced from the valve, said cam face variably controlled by the rotary movement of the rod, a flange on the nozzle to limit the insertion of the point and the lower portion of said nozzle formed with an open channel communicating with the bore of the nozzle above the flange.

4. A weed exterminating tool comprising a container including upper and lower end walls, a bored pointed injecting nozzle carried by the lower end wall and equipped with a normally yielding valve, a spring pressed axially movable operating rod rotatably supported by the upper wall and having a portion thereof projecting above the container, a valve operating member provided with a cam face aligned with and normally spaced from the valve, said cam face variably controlled by the rotary movement of the rod, a flange on the nozzle to limit the insertion of the point and the lower portion of said nozzle formed with an open channel communicating with the bore of the nozzle above the flange, and a normally closed air vent on the container opening in response to the axial movement of the operating rod.

5. A weed exterminating tool comprising a container including upper and lower end walls, a bored pointed injecting nozzle carried by the lower end wall and equipped with a normally yielding valve, a spring pressed axially movable operating rod rotatably supported by the upper wall and having a portion thereof projecting above the container, a valve operating member provided with a cam face aligned with and normally spaced from the valve, said cam face variably controlled by the rotary movement of the rod, a flange on the nozzle to limit the insertion of the point and the lower portion of said nozzle formed with an open channel communicating with the bore of the nozzle above the flange, a normally closed air vent on the container opening in response to the axial movement of the operating rod, and finger gripping handles carried by the opposite sides of the container.

ALBERT H. THOMAS.